Patented Jan. 9, 1951

2,537,262

UNITED STATES PATENT OFFICE 2,537,262

LUMINESCENT ZINC FLUORIDE AND METHOD OF PREPARING SAME

Bennett S. Ellefson, Bayside, N. Y., assignor to Sylvania Electric Products, Inc., a corporation of Massachusetts No Drawing. Application June 12, 1946, Serial No. 676,337

6 Claims. (Cl. 117—33.5)

1

This invention refers to luminescent materials and to methods of attaching them to a glass support. More particularly it refers to luminescent zinc fluoride and to a method of attaching a screen of the luminescent material to the inner wall of an electron discharge tube.

In the past luminescent screens of zinc silicate, zinc sulphide, and related materials have been attached to the viewing window of cathode ray tubes without the use of binders by settling the luminescent powders onto the glass surface from an aqueous suspension. In accordance with this method the aqueous suspension is introduced into the cathode ray tube bulb and allowed to form a pool of substantially uniform height on the viewing window. After this pool has been allowed to stand in the bulb for a prolonged period of time without agitation the powder particles settle out onto the surface of the container. The remaining liquid is then siphoned out and the luminescent layer carefully dried. The technique is well known and adapts itself to mass production.

In contradistinction to the above described successful method of handling zinc silicate and zinc sulphide powders, considerable difficulty has been encountered heretofore in applying luminescent zinc fluoride particles to glass supports such as the inner wall of an electron discharge tube by a similar settling method. Not only was the luminescence of the resulting screen seriously impaired but a supplementary binding agent had to be incorporated into the aqueous suspension if an adherent coating was desired. Furthermore it was found that the more prolonged the settling operation the greater the loss in luminescence, while on the other hand the shorter the settling operation the more imperfect the screen.

One of the objects of this invention is to provide a luminescent zinc fluoride which can be firmly attached to the inner wall of an electron tube in the form of a screen without the aid of a binder material.

Another object of this invention is to provide a method of settling a good adherent coating of luminescent zinc fluoride particles onto a glass support without the addition of a binder.

A further object is to provide a method of settling a luminescent zinc fluoride from a liquid suspension onto a glass support in which the settling action can be prolonged without deleteriously affecting the luminosity of the screen formed.

In accordance with my invention these and other advantages which are incidental to its application can be obtained by the addition of small amounts of crystal growth inhibiting agents to

2 the activating agent-zinc fluoride mixture immediately prior to or during the formation of the activated zinc fluoride crystals.

It is well known in the art that powders consisting of small particles of the order of 2 to 4 microns will adhere to glass surfaces without the aid of an auxiliary binder. This phenomena is presumably attributable to the Van der Waals' forces. It has furthermore been established that a material containing a heterogeneous distribution of particle sizes can be brought to a tacky adherence to a support when particles of the size up to 30 microns in diameter are present in addition to particles of the order of 2 to 4 microns. This effect may be explained by a mechanical locking of larger particles by the adherent smaller particles.

It, therefore, has been recognized that the success of the liquid settling of luminescent screens of zinc silicate and zinc sulphide without a binder is, in all probability, due to the fact that these materials can easily be obtained in the form of powders whose particle size is very small, whereas the lack of success obtained when using zinc fluoride has been attributed to the fact that the activated zinc fluoride crystals are large and in addition have a lamellar crystal habit.

Numerous attempts have therefore been made to bring the size of the activated zinc fluoride crystals down within the preferred range. However, the control of particle size in the preparation of activated zinc fluoride is difficult because the activating of the zinc fluoride by the diffusion of the activating agent therein takes place at relatively high temperatures. In fact, these temperatures are close to the melting point of the zinc fluoride. At this temperature the zinc fluoride crystals grow at a very rapid rate and control of their growth is very difficult. Naturally, if the firing temperature is kept low it is possible to minimize the crystal growth to some extent but not sufficiently to keep the particle size within the preferred range. If attempts are made to reduce the particle size by a simple crushing operation the resulting crystals lose their luminescence to a substantial degree. This is normally true of any luminescent crystals which are subjected to simple crushing operations.

I have found, however, that the growth of the zinc fluoride crystals during the firing step or activating stage can be inhibited to a very marked degree by the addition of small amounts in the order of 1 to 5% of silicic acid, tin oxide, magnesium fluoride or aluminum fluoride. Of these silicic acid is preferred since it has been found that it will tend to inhibit the growth of zinc fluoride crystals at any temperature, without producing any undesirable effect on the luminescent properties of the resulting activated crystals. On the other hand although the tin oxide, magnesium fluoride, and aluminum fluoride also retard the crystal growth during the activating stage, the resulting crystals do not possess the maximum luminescence.

Although the crystal growth inhibiting agent can be added in amounts covering a rather wide range, it has been found that the preferred amount is about 4% when the zinc fluoride is being activated by the diffusion of 1.5% of manganese therein. It is preferred that the growth inhibiting agent be added to the activating agent zinc fluoride mixture prior to the firing step in which the diffusion occurs and in which the crystals would normally tend to grow. However, it is entirely feasible to add these agents during the firing step and still get the desired results.

Since the particles obtained as a result of the firing step in which the activating agent is diffused into the zinc fluoride are not in the form of individual crystal particles but consist of an aggregation of a plurality of sintered crystal clusters, some means has had to be provided to break down the particles into the component crystals if full advantage is to be taken of their small size. Although it has been recognized that the crystals cannot be separated from one another by a ball milling operation, if their luminescence is not to be partially destroyed, it has been found that the crystal clusters can be broken down to their component parts, by rod milling in a non-aqueous medium such as acetone without deleteriously affecting the luminescence of the zinc fluoride crystals. The rod milling has the effect of separating the crystal particles, which go to form the agglomerate, from one another without breaking a significant number of the crystals. This phenomena can perhaps be explained by the fact that the pressure exerted by the two points of contact of two balls is too high to preserve the structure of the crystals needed for maximum luminescence whereas during rod milling a large number of particles is pressed along the line of contact of the rods and thereby reduces the force applied to any one of these particles.

Although zinc fluoride of satisfactory particle size (majority 2 to 6 microns) can be prepared successfully with the use of crystal growth inhibiting agents and a succeeding rod milling operation, I have found it to be preferable practice to pass the crystal particles through a 325 mesh stainless steel filter. In this manner I obtain a selection of zinc fluoride particles with which it is possible to prepare adherent screens on a glass surface by a liquid settling process without the aid of an auxiliary binder.

In accordance with my invention I have further found that if the zinc fluoride particles are suspended in a liquid in which they are not soluble, and which has the ability to wet the powder as well as the supporting surface, the period of settling can be increased markedly without deleteriously affecting the luminesence of the formed screen. Preferred examples of liquids suitable for use in settling the zinc fluoride particles include alcohol and acetone as well as numerous other organic materials in which the activated zinc fluoride is not soluble.

The small particle size activated zinc fluoride of my invention can be prepared in many different ways. In view of the fact that a high degree of purity of product is desirable if the best results are to be obtained, it is however preferred practice to prepare the activated material from a precipitated zinc fluoride compound. Of the several possible reactants and methods available for the preparation of this precipitate, a preferred one is the reaction of a solution of hydrofluoric acid with a water suspension of a basic zinc carbonate. The manganese which in the subsequent firing step becomes the activator for luminescence, can also be added as a carbonate in the water suspension, and precipitated as a fluoride simultaneously with the zinc fluoride.

The purity of the reactant should be carefully controlled during this time since it has been found that iron present in concentrations as low as 0.0005% in the finished luminescent material seriously reduces its luminescent efficiency. The limits of other impurities such as silver, lead, and nickel must also be controlled but the tolerance quantities are much higher.

In view of the high standard of purity which should be maintained, the precipitation reaction is preferably carried out in a pyrex vessel, whereas the measurements of the hydrofluoric acid solution is preferably carried out in a plastic vessel in veiw of its glass corrosive properties. An excess of hydrofluoric acid is preferably used to insure complete precipitation of the zinc. After the precipitation the precipitate is washed with distilled water and carefully dried.

Preferably this drying operation is carried out under carefully regulated conditions in order to minimize the hydrolysis decomposition or oxidation of the zinc fluoride. The precipitate is first dried at or below 45° centigrade for 16 hours whereupon it is maintained at 110° centigrade for 24 more hours.

If the manganese has not already been added by co-precipitation as mentioned above, it can be added mechanically at this point in the form of a fluoride by milling it into the dried zinc fluoride precipitate.

The dried zinc fluoride precipitate containing a preferred concentration of manganese of 1.5% by weight may then be placed in a covered platinum crucible and fired. For a platinum crucible of a 50 milliliter size telescoped into an open alundum protection crucible, a satisfactory firing schedule is 30 minutes at 700° C. It has been found that additions of up to 5% of silicic acid to the precipitate and the use of the same firing schedule as given above, will produce a zinc fluoride of a small crystal size (majority to 6 microns) without any noticeable change in the luminescent characteristics of the activated zinc fluoride.

In preferred practice, the activated zinc fluoride crystals so formed are then suspended in a solution of acetone and subjected to a rod-milling operation to break down a large percentage of the existing crystal clusters found present in the fired mass. This operation does not seriously affect the luminescent properties of the resulting crystals. The milled crystalline powder is then passed through a 325 mesh sieve to remove any large crystal agglomerate that still may be present.

The heterogeneous distribution of crystal and particle sizes existing within the powder which passes through the 325 mesh sieve after milling, makes it possible to prepare adherent screens without the aid of an auxiliary binder. These luminescent screens may be prepared in accordance with the normal liquid settling method by suspending the crystal particles in a liquid medium which will wet both the crystal particles and the glass support but which will not tend to dissolve the crystals. Such medium as has been pointed out may be either acetone, alcohol, or some similar organic. The liquid suspension is then introduced into the electron discharge device, such as a cathode ray tube bulb, where it is allowed to form a pool of substantially uniform height on the viewing window. As this pool is allowed to stand in the bulb for a prolonged period of time without agitation, the powder particles settle out onto the surface of the tube. The remaining liquid is then siphoned out and the luminescent layer carefully dried, in accordance with the technique which has heretofore been employed when settling luminescent materials from an aqueous suspension. The luminescent screen so-formed is highly adherent and does not have any of its luminescence impaired.

While the above description discloses preferred and practical embodiments of the luminescent materials of this invention and the methods for making them, it will be understood by those skilled in the art that the specific details described are by way of limitation and are not to be construed as limiting the scope of the invention.

What I claim is:

1. A luminescent material consisting of a fired mixture of 94.5% by weight of zinc fluoride, 4% by weight of silicic acid, and 1.5% by weight of manganese fluoride.

2. A luminescent material consisting of a manganese activated zinc fluoride fired in the presence of 1 to 5% silicic acid.

3. In the method of producing luminescent zinc fluoride crystals in which the size of the majority of the crystals falls within the range of 2 to 6 microns the steps comprising mixing zinc fluoride with a manganese salt activator in activating proportions and firing the mixture in the presence of 1 to 5% of silicic acid.

4. In the method of producing luminescent zinc fluoride crystals in which the size of the majority of the crystals falls within the range of 2 to 6 microns the steps comprising mixing zinc fluoride with 1.5% by weight of manganese fluoride and firing the mixture in the presence of 4% of silicic acid.

5. A luminescent screen consisting of a glass support to which are attached crystal particles of dimensions of the order of 2-4 microns consisting of 94.5% by weight of zinc fluoride, 4% by weight of silicic acid, and 1.5% by weight of manganese fluoride.

6. A luminescent screen consisting of a glass support to which are attached crystal particles of dimensions of the order of 2-4 microns consisting of a fired mixture of zinc fluoride, a manganese activator and 1-5% by weight of silicic acid.

BENNETT S. ELLEFSON.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,176,099 | Pfanstiehl | Oct. 17, 1939 |
| 2,223,830 | Leverenz | Dec. 3, 1940 |
| 2,299,510 | Steadman | Oct. 20, 1942 |
| 2,328,292 | Painter | Aug. 31, 1943 |
| 2,361,467 | Fernberger | Oct. 31, 1944 |
| 2,372,071 | Fernberger | Mar. 20, 1945 |
| 2,409,174 | Dietz | Oct. 8, 1946 |
| 2,409,574 | Leverenz | Oct. 15, 1946 |
| 2,447,447 | Williams | Aug. 17, 1948 |

FOREIGN PATENTS

| Number | Country | Date |
|---|---|---|
| 500,404 | Great Britain | Feb. 8, 1939 |

OTHER REFERENCES

Smith's "College Chemistry," 1946 (D. Appleton-Century Co. Inc.), page 514.

Chemical Abstracts, vol. 18, page 2287.